United States Patent
Morser et al.

(10) Patent No.: US 10,090,929 B2
(45) Date of Patent: Oct. 2, 2018

(54) DRONE-BASED RADIO-OVER-FIBER SYSTEM

(71) Applicant: EQUINOX INNOVATIVE SYSTEMS LLC, Annapolis, MD (US)

(72) Inventors: Randal T. Morser, Annapolis, MD (US); Timothy M. Schaefer, Rochester, MN (US)

(73) Assignee: EQUINOX INNOVATIVE SYSTEMS LLC, Annapolis, MD (US)

( * ) Notice: Subject to any disclaimer, the term of this patent is extended or adjusted under 35 U.S.C. 154(b) by 0 days.

(21) Appl. No.: 15/949,984

(22) Filed: Apr. 10, 2018

(65) Prior Publication Data

US 2018/0234186 A1      Aug. 16, 2018

Related U.S. Application Data

(63) Continuation of application No. 15/591,044, filed on May 9, 2017, now abandoned.
(Continued)

(51) Int. Cl.
*H04B 10/00* (2013.01)
*H04B 10/2575* (2013.01)
(Continued)

(52) U.S. Cl.
CPC ....... *H04B 10/2575* (2013.01); *H04B 10/801* (2013.01); *H04J 14/0241* (2013.01); *B64C 2201/122* (2013.01); *H04B 2210/006* (2013.01)

(58) Field of Classification Search
CPC .. H04B 10/2575; H04B 10/801; H04B 10/11; H04B 10/2503; H04B 10/2581;
(Continued)

(56) References Cited

U.S. PATENT DOCUMENTS

| | | | | |
|---|---|---|---|---|
| 5,186,414 A | * | 2/1993 | Holzschuh | F41G 7/32 244/3.12 |
| 7,715,722 B1 | | 5/2010 | Hoke et al. | |

(Continued)

FOREIGN PATENT DOCUMENTS

DE      102005047742 A1      4/2007
FR            2942577 A1      8/2010
(Continued)

OTHER PUBLICATIONS

"Military Grade UAV Tether System," Polarity® website; 2 pages, printed on Mar. 7, 2017 from http://www.polarity.net/cms_files/Tether%20System%20Final%20Mech%20r4.pdf.
(Continued)

*Primary Examiner* — Hibret Woldekidan
(74) *Attorney, Agent, or Firm* — Richard C. Litman

(57) ABSTRACT

The drone-based radio-over-fiber system provides an unmanned aerial vehicle (AV), preferably a multi-rotor drone, connected to a base station by a tether including an optical fiber. A radio frequency-over-fiber system is used for bidirectional data communications between at least one radio frequency (RF) transmitter at the base station and at least one antenna mounted on the drone through the optical fiber in the tether. The system includes wave division multiplexers/demultiplexers that permit ultrahigh bandwidth communication over the tether. An embodiment of the system for 2×2 multiple-input, multiple-output (MIMO) signals in the 700 MHz LTE band is described.

19 Claims, 2 Drawing Sheets

Related U.S. Application Data

(60) Provisional application No. 62/384,862, filed on Sep. 8, 2016.

(51) Int. Cl.
*H04J 14/02* (2006.01)
*H04B 10/80* (2013.01)

(58) Field of Classification Search
CPC .............. H04B 2210/006; H04B 7/024; H04B 7/18504; H04J 14/0241; H04J 14/0227; B64C 2201/122; B64C 39/024; B64C 2201/143; H04W 24/02; G01W 1/08
USPC ........... 398/79, 118, 125, 128, 115, 116, 117
See application file for complete search history.

(56) References Cited

U.S. PATENT DOCUMENTS

| | | | |
|---|---|---|---|
| 7,734,188 B2* | 6/2010 | Kuwata | H04J 14/02 370/516 |
| 9,088,366 B2* | 7/2015 | Matsui | H04B 10/073 |
| 9,250,496 B1 | 2/2016 | Thaniyavarn | |
| 9,800,091 B2* | 10/2017 | Nugent, Jr. | B64C 39/022 |
| 9,862,488 B2* | 1/2018 | Hunt | B64C 39/024 |
| 9,979,465 B2* | 5/2018 | Hreha | H04B 7/18521 |
| 2002/0181668 A1 | 12/2002 | Masoian et al. | |
| 2005/0103943 A1* | 5/2005 | Tanielian | B64C 39/024 244/190 |
| 2010/0083330 A1 | 4/2010 | Bernstein et al. | |
| 2010/0278535 A1* | 11/2010 | Kim | H04B 10/272 398/72 |
| 2015/0357868 A1* | 12/2015 | Stone | G02B 6/3604 307/9.1 |
| 2015/0382272 A1* | 12/2015 | Carichner | H04W 88/10 370/338 |
| 2016/0134358 A1* | 5/2016 | Jalali | H04B 7/18504 455/11.1 |
| 2016/0309341 A1* | 10/2016 | Priest | B64C 39/022 |
| 2017/0069214 A1* | 3/2017 | Dupray | G08G 5/0021 |
| 2017/0187450 A1* | 6/2017 | Jalali | H04W 84/06 |
| 2018/0097567 A1* | 4/2018 | LeGrange | H04B 10/293 |
| 2018/0102805 A1* | 4/2018 | Ukon | H04B 1/525 |
| 2018/0145751 A1* | 5/2018 | Barad | H04B 10/54 |
| 2018/0166779 A1* | 6/2018 | Feria | H01Q 1/24 |

FOREIGN PATENT DOCUMENTS

| | | |
|---|---|---|
| RU | 2470250 C2 | 10/2012 |
| WO | WO 2013/052178 | 4/2013 |

OTHER PUBLICATIONS

"Your Drone-Your Vision"; 12 pages, printed on Mar. 7, 2017 from http://www.ineeddrone.com/portable-tethered.html.

Ackerman, "Fiber Enables Battlefield Radio Transmissions", Signal (Jul. 2010), 4 pages.

"SBIR/STTR Success Syntonics LLC" 2 pages, published at www.sbir.gov/sites/default/files/SBA_Success_Syntonics_LLC.pdf, printed Mar. 22, 2017.

"Syntonics Introduces Tethered Drone Radio Network Range Extension System", Syntonics Press Release, May 20, 2016, 1 page.

"High Altitude Helikite RF-over-Fibre Radio Relay", 2 pages, published at vialite.com/wp-content/uploads/2016/02/ViaLite-Case-Study-High-Altitude-Helikite-RF-over-Fiber.pdf, printed Mar. 22, 2017.

"RoF-RF over Fiber basics", 4 pages, published at www.rfwireless-world.com/Terminology/RoF-Rf-over-Fiber.html, printed Mar. 21, 2017.

"µlinx™ Tether Optical Fiber Cables", 1 page, published at sedi-fibres.com/fr/images_db/micro-linx_tether_optical_fiber_cables.pdf, printed Mar. 22, 2017.

Any identified foreign patents and/or publications were properly submitted in parent U.S. Appl. No. 15/591,044, filed May 9, 2017, the priority of which is claimed.

* cited by examiner

DRONE-BASED RADIO-OVER-FIBER SYSTEM

CROSS-REFERENCE TO RELATED APPLICATION

This application is a continuation of Ser. No. 15/591,044, filed May 9, 2017 which claims the benefit of U.S. Provisional Patent Application Ser. No. 62/384,862, filed on Sep. 8, 2016.

BACKGROUND OF THE INVENTION

1. Field of the Invention

The present invention relates to telecommunication systems, and particularly to a drone-based radio-over-fiber (or radio frequency over fiber [RFoF]) system for coupling a telecommunication base station with an aerial drone, which has an on-board communication transceiver, through analog radio frequency (RF) signals transmitted through fiber optics.

2. Description of the Related Art

Aerial drones have been used in telecommunications to add portability and adjustability to radio transceivers. A typical system couples a ground-based transmission station to an aerial drone, replacing a conventional fixed radio tower with a radio system (including an antenna) mounted on the drone. The drone may be tethered to the ground station by digital fiber, a coaxial cable or the like. In such systems, particularly for tether/cable lengths over 100 feet in length, a 20 dB loss in signal intensity can be expected. Further, the full set of radio equipment that must be mounted on or in the drone dramatically increases the size, weight and power consumption of the drone.

Radio-over-fiber (RoF) or Radio Frequency-over-fiber (RFoF) is a communications technology in which light is modulated by a radio frequency signal and transmitted over an optical fiber link. In RoF architecture, a data-carrying radio frequency (RF) signal with a high frequency is imposed on a light wave signal before being transported over the optical link. Wireless signals are optically distributed to base stations directly at high frequencies and converted from the optical to electrical domain at the base stations before being amplified and radiated by an antenna. As a result, no frequency up-down conversion is required at the various base stations, thereby resulting in simple and cost-effective implementation enabled at the base stations. RoF also offers the advantages of lower transmission losses and reduced sensitivity to noise and electromagnetic interference when compared to all-electrical signal transmission. Thus, a drone-based radio-over-fiber system solving the aforementioned problems is desired.

SUMMARY OF THE INVENTION

The drone-based radio-over-fiber system provides an unmanned aerial vehicle (AV), preferably a multi-rotor drone, connected to a base station by a tether including an optical fiber. A radio frequency-over-fiber system is used for bidirectional data communications between at least one radio frequency (RF) transmitter at the base station and at least one antenna mounted on the drone through the optical fiber in the tether. The system includes wave division multiplexers/demultiplexers that permit ultrahigh bandwidth communication over the tether.

An embodiment of the system for 2×2 multiple-input, multiple-output (MIMO) signals in the 700 MHz LTE band is described.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
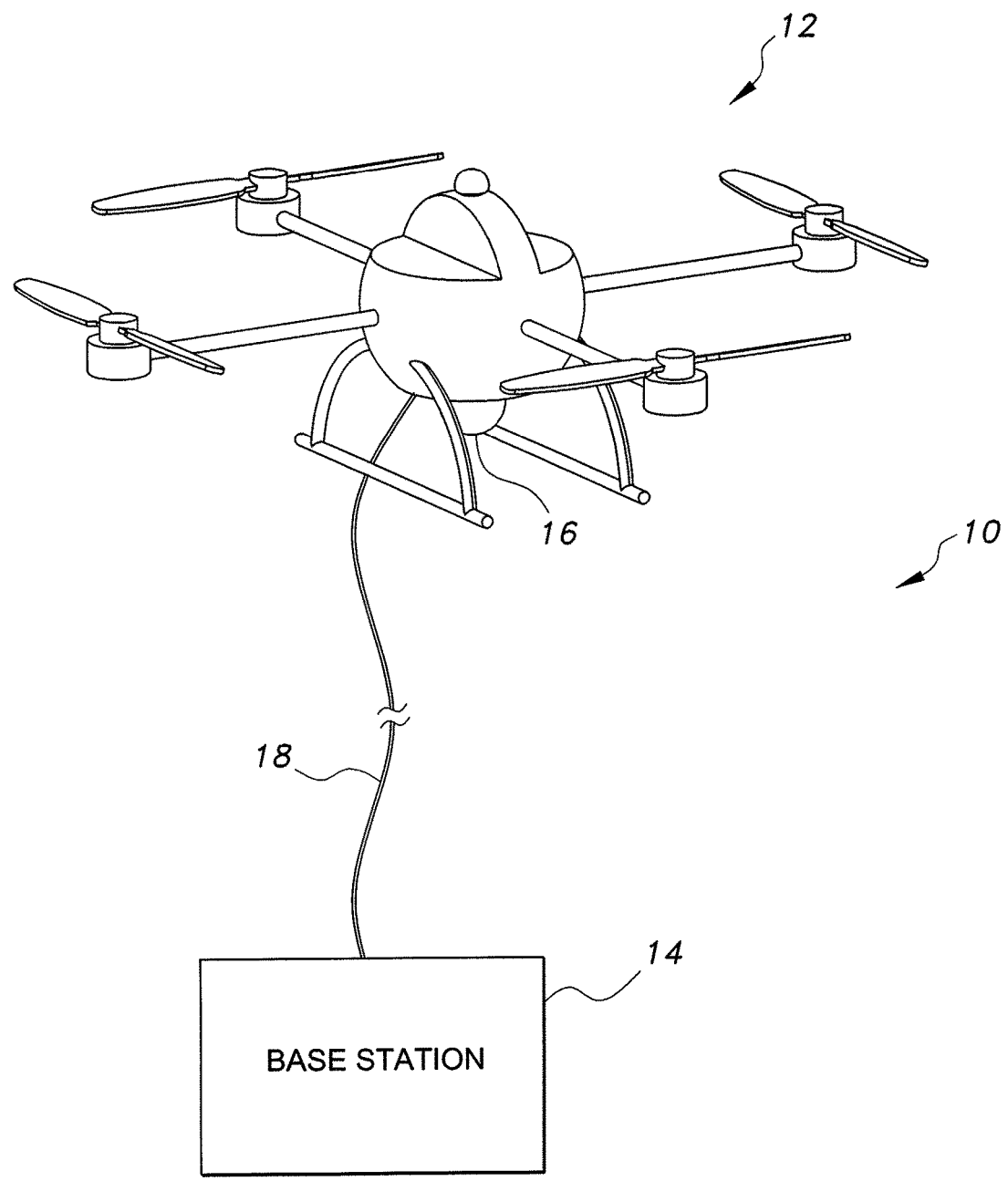
FIG. 1 diagrammatically illustrates a drone-based radio-over-fiber system according to the present invention.
Figure 2:
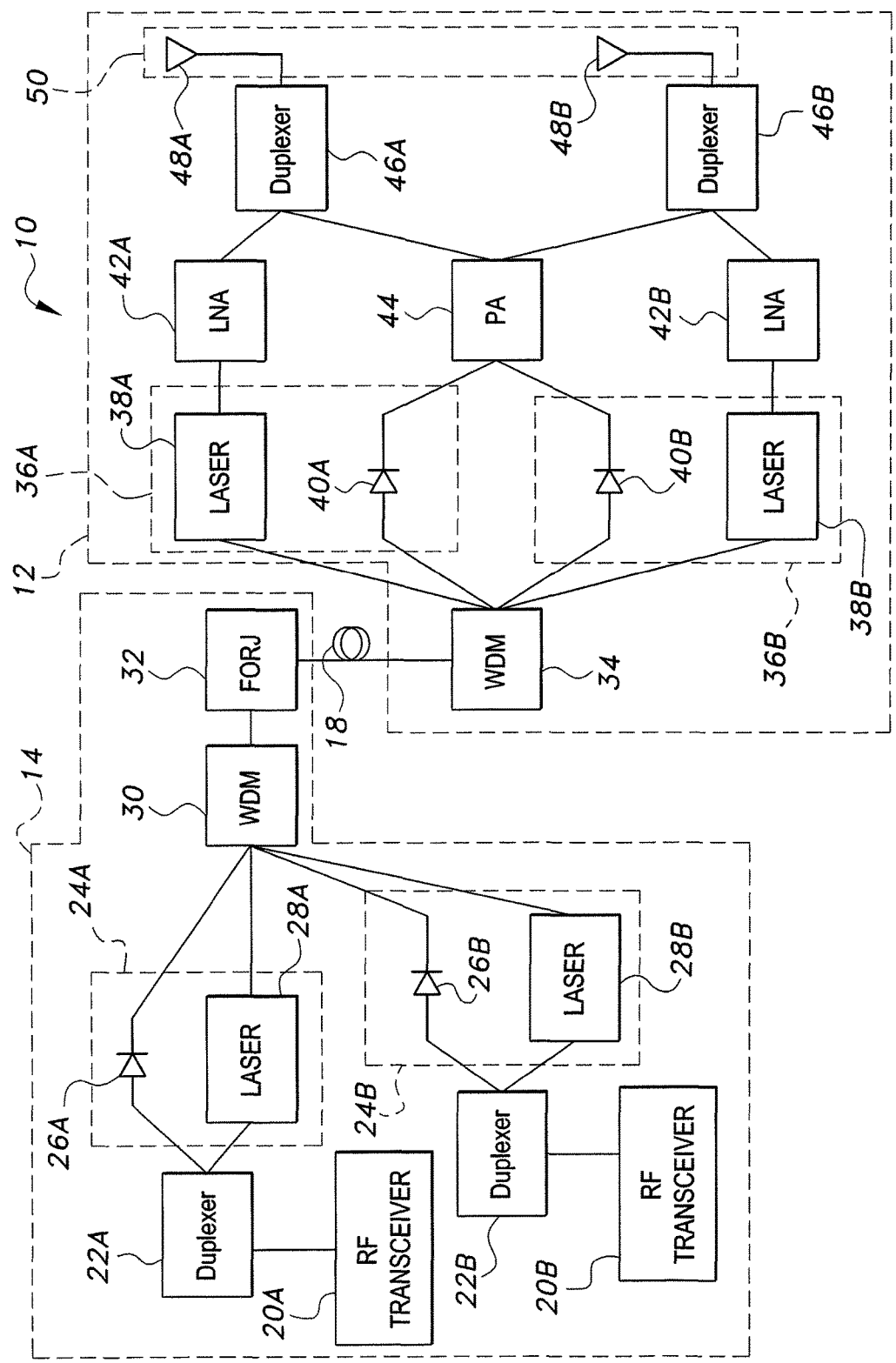
FIG. 2 is a block diagram showing system components of an embodiment of a drone-based radio-over-fiber system according to the present invention configured for a 2×2 MIMO antenna-LTE 700 MHz band system.

As shown in FIG. 1, The drone-based radio-over-fiber system provides an unmanned aerial vehicle (AV), preferably a multi-rotor drone 12, connected to a base station 14 by a tether 18 including an optical fiber. A radio frequency-over-fiber system is used for bidirectional data communications between at least one radio frequency (RF) transmitter at the base station 18 and at least one antenna mounted on the drone through the optical fiber in the tether 18. The system includes wave division multiplexers/demultiplexers that permit ultrahigh bandwidth communication over the tether 18. As best seen in FIG. 2, in some embodiments, the drone-based radio-over-fiber system 10 includes a pair of base station radio frequency (RF) transceivers 20A, 20B, respectively, coupled to a first pair of optical modulator-demodulators 24A, 24B. In the MIMO system of FIG. 2, each transceiver 24A, 24B can simultaneously transmit/receive separate and independent data signals, thereby making efficient use of the bandwidth. A first pair of duplexers 22A, 22B is in respective communication with the pair of base station radio frequency transceivers 20A, 20B and the first pair of optical modulator-demodulators 24A, 24B. It should be understood that any suitable type of optical modulator-demodulators used in RoF applications may be utilized. As an example, each of the first pair of optical modulator-demodulators 24A, 24B may respectively include a 700 MHz RF diode 26A, 26B coupled with a corresponding laser 28A, 28B. Thus, when analog RF signals are generated by RF transceivers 20A, 20B, the first pair of optical modulator-demodulators 24A, 24B output a pair of optical signals which are modulated by the respective RF signals. These modulated signals are then received by a first wavelength division multiplexer (WDM) 30 for outputting a modulated signal. Further, the first pair of optical modulator-demodulators 24A, 24B may receive a modulated optical signal from first wavelength division multiplexer (WDM) 30 and demodulate the optical signal to deliver corresponding received RF signals to the pair of base station radio frequency transceivers 20A, 20B. As is well known in the art, briefly, in fiber optic communications, a wavelength division multiplexer multiplexes a number of optical carrier signals onto a single optical fiber by using different wavelengths of laser light. The WDM enables bidirectional communications over one strand of fiber, as well as multiplication of capacity.

The first wavelength division multiplexer 30 optically couples the pair of optical modulator-demodulators 24A, 24B to a first end of a tether 18 for the aerial drone 12. The tether 18 is in the form of an optical fiber for transmitting the modulated optical signals. Any suitable type of optical coupler may be used to couple the first WDM 30 to tether 18, such as, for example, dual-pass fiber optic rotary joint (FORJ) 32. It should be understood that tether 18 may be any suitable type of fiber optic cable, such as single-mode fiber optic cable. The cable jacket may include a strengthening element, preferably Spectra® (Spectra is a registered trademark of Honeywell International referring to ultrahigh molecular weight polyethylene fibers) shielding in the jacket, although Kevlar® (Kevlar is a registered trademark of E.I. du Pont de Nemours and Company referring to a polyaramid fiber) shielding might be used in some embodiments. Preferably, the optical signals are modulated by analog RF, thus allowing for transmission of analog RF through the optical fiber tether 18.

The aerial drone 12 may be any suitable type of conventional airborne drone or unmanned aerial vehicle, but includes an on-board communication system. The on-board communication system has a second pair of optical modulator-demodulators 36A, 36B which are coupled to a second end of the tether 18 by a second wavelength division multiplexer (WDM) 34. Similar to that described above with regard to the base station 14, it should be understood that any suitable type of optical modulator-demodulators used in RoF applications may be utilized. As an example, each of the second pair of optical modulator-demodulators 36A, 36B may respectively include a 700 MHz RF diode 40A, 40B coupled with a corresponding laser 38A, 38B. Thus, when the second pair of optical modulator-demodulators 36A, 36B receive a modulated optical signal from second wavelength division multiplexer (WDM) 34 (transmitted thereto through tether 18), the signal is demodulated to deliver corresponding received RF signals to a pair of antennae 48A, 48B of a 2×2 multiple-input and multiple-output (MIMO) antenna system 50 (which is also part of the on-board communication system). Similarly, when RF signals are received by the pair of antennas 48A, 48B of the MIMO antenna system 50, the RF signals are respectively delivered to the second pair of optical modulator-demodulators 36A, 36B, which then output optical signals modulated by the respective RF signals. These modulated optical signals are fed to second WDM 34 and transmitted to base station 14 through tether 18.

As in a conventional dual-channel RF system, a second pair of duplexers 46A, 46B may be in respective communication with the second pair of optical modulator-demodulators 36A, 36B and the pair of antennae 48A, 48B. Preferably, low power amplifiers 42A, 42B respectively couple the second pair of duplexers 46A, 46B to the second pair of optical modulator-demodulators 36A, 36B, as well as a power amplifier 44. For the example given above of 700 MHz RF diodes, power amplifier 44 would similarly be a dual-channel 700 MHz power amplifier.

As shown in FIG. 1, the drone 12 carries an additional payload 16, allowing drone 12 to be used for a variety of different applications in addition to the communication capability described above. Payload 16 may include, for example, electro-optical camera systems, an infrared (IR) camera, a thermal camera, a multi-spectral camera, a light detection and ranging (LIDAR) system, a laser designator system or the like. Further, it should be understood that drone 12 may include any suitable type of hardware or additional payloads typically associated with aerial drones or unmanned aerial vehicles, such as global positioning system (GPS) navigation, accelerometers, gyroscopic control and stabilizing systems, backup batteries and the like.

Further, in addition to the communications applications described above, the MIMO antenna system 50 may be used for detection and direction-finding of RF signals. This may be used, for example, for detection of damaged radio components, the collection of RF signals for compliance verification, the collection of RF signals for surveying and geolocation and the like.

It is to be understood that the present invention is not limited to the embodiments described above, but encompasses any and all embodiments within the scope of the following claims.

We claim:

1. A drone-based radio-over-fiber system, comprising:
a base station having:
a pair of base station radio frequency transceivers;
a first pair of optical modulator-demodulators, respectively, in communication with the pair of base station radio frequency transceivers; and
a first wavelength division multiplexer in communication with the pair of optical modulator-demodulators;
a tether including an optical fiber having a first end in optical communication with the first wavelength division multiplexer;
an aerial drone having an on-board communication system, the on-board communication system including:
a second wavelength division multiplexer in optical communication with a second end of the tether;
a second pair of optical modulator-demodulators in communication with the second wavelength division multiplexer; and
a multiple-input, multiple-output antenna system having a pair of antennas, respectively, in communication with the second pair of optical modulator-demodulators.

2. The drone-based radio-over-fiber system as recited in claim 1, wherein said base station further comprises a first pair of duplexers in respective communication with the pair of base station radio frequency transceivers and the first pair of optical modulator-demodulators.

3. The drone-based radio-over-fiber system as recited in claim 2, wherein said base station further comprises a dual-pass fiber optic rotary joint coupling the first wavelength division multiplexer to the first end of the tether.

4. The drone-based radio-over-fiber system as recited in claim 3, wherein said on-board communication system further comprises a second pair of duplexers in respective communication with the second pair of optical modulator-demodulators and the pair of antennae of the multiple-input and multiple-output antenna system.

5. The drone-based radio-over-fiber system as recited in claim 4, wherein said on-board communication system further comprises a pair of low noise amplifiers in respective communication with the second pair of duplexers and the second pair of optical modulator-demodulators.

6. The drone-based radio-over-fiber system as recited in claim 5, wherein said on-board communication system further comprises a dual channel power amplifier coupling the second pair of optical modulator-demodulators and the second pair of duplexers.

7. The drone-based radio-over-fiber system as recited in claim 1, wherein each of the pair of base station radio frequency transceivers comprises an analog radio frequency transceiver.

8. A drone-based radio-over-fiber system, comprising:
a base station having:
   a pair of base station radio frequency transceivers;
   a first pair of optical modulator-demodulators, respectively, in communication with the pair of base station radio frequency transceivers; and
   a first wavelength division multiplexer in communication with the pair of optical modulator-demodulators;
a tether, the tether including an optical fiber;
a dual-pass fiber optic rotary joint optically coupling the first wavelength division multiplexer to a first end of the tether;
an aerial drone having an on-board communication system, the on-board communication system including:
   a second wavelength division multiplexer in optical communication with a second end of the tether;
   a second pair of optical modulator-demodulators in communication with the second wavelength division multiplexer; and
   a multiple-input and multiple-output antenna system having a pair of antennas, respectively, in communication with the second pair of optical modulator-demodulators.

9. The drone-based radio-over-fiber system as recited in claim 8, wherein said base station further comprises a first pair of duplexers in respective communication with the pair of base station radio frequency transceivers and the first pair of optical modulator-demodulators.

10. The drone-based radio-over-fiber system as recited in claim 9, wherein said on-board communication system further comprises a second pair of duplexers in respective communication with the second pair of optical modulator-demodulators and the pair of antennae of the multiple-input and multiple-output antenna system.

11. The drone-based radio-over-fiber system as recited in claim 10, wherein said on-board communication system further comprises a pair of low noise amplifiers in respective communication with the second pair of duplexers and the second pair of optical modulator-demodulators.

12. The drone-based radio-over-fiber system as recited in claim 11, wherein said on-board communication system further comprises a dual channel power amplifier coupling the second pair of optical modulator-demodulators and the second pair of duplexers.

13. The drone-based radio-over-fiber system as recited in claim 8, wherein each of the pair of base station radio frequency transceivers comprises an analog radio frequency transceiver.

14. A drone-based radio-over-fiber system, comprising:
a base station having:
   a pair of base station radio frequency transceivers, each of the base station radio frequency transceivers having an analog radio frequency transceiver;
   a first pair of optical modulator-demodulators, respectively, in communication with the pair of base station radio frequency transceivers; and
   a first wavelength division multiplexer in communication with the pair of optical modulator-demodulators;
a tether, including an optical fiber having a first end in optical communication with the first wavelength division multiplexer;
an aerial drone having an on-board communication system, the on-board communication system including:
   a second wavelength division multiplexer in optical communication with a second end of the tether;
   a second pair of optical modulator-demodulators in communication with the second wavelength division multiplexer; and
   a multiple-input, multiple-output (MIMO) antenna system having a pair of antennas, respectively, in communication with the second pair of optical modulator-demodulators.

15. The drone-based radio-over-fiber system as recited in claim 14, wherein said base station further comprises a first pair of duplexers in respective communication with the pair of base station radio frequency transceivers and the first pair of optical modulator-demodulators.

16. The drone-based radio-over-fiber system as recited in claim 15, wherein said base station further comprises a dual-pass fiber optic rotary joint coupling the first wavelength division multiplexer to the first end of the tether.

17. The drone-based radio-over-fiber system as recited in claim 16, wherein said on-board communication system further comprises a second pair of duplexers in respective communication with the second pair of optical modulator-demodulators and the pair of antennas of the multiple-input and multiple-output antenna system.

18. The drone-based radio-over-fiber system as recited in claim 17, wherein said on-board communication system further comprises a pair of low noise amplifiers in respective communication with the second pair of duplexers and the second pair of optical modulator-demodulators.

19. The drone-based radio-over-fiber system as recited in claim 18, wherein said on-board communication system further comprises a dual channel power amplifier coupling the second pair of optical modulator-demodulators and the second pair of duplexers.

* * * * *